(12) United States Patent
Eke et al.

(10) Patent No.: US 10,333,443 B2
(45) Date of Patent: Jun. 25, 2019

(54) APPARATUS AND METHOD FOR CONTROLLING A DEVICE

(71) Applicant: Dialog Semiconductor (UK) Limited, London (GB)

(72) Inventors: David Eke, Dalkeith (GB); Krzysztof Nguyen, Edinburgh (GB)

(73) Assignee: Dialog Semiconductor (UK) Limited, London (GB)

( * ) Notice: Subject to any disclaimer, the term of this patent is extended or adjusted under 35 U.S.C. 154(b) by 85 days.

(21) Appl. No.: 15/470,157

(22) Filed: Mar. 27, 2017

(65) Prior Publication Data

US 2018/0159452 A1  Jun. 7, 2018

Related U.S. Application Data

(63) Continuation-in-part of application No. 15/464,623, filed on Mar. 21, 2017.

(30) Foreign Application Priority Data

Dec. 6, 2016  (GB) .................................... 1620746.6

(51) Int. Cl.
| | |
|---|---|
| *H02P 6/182* | (2016.01) |
| *H02P 7/285* | (2016.01) |
| *H02K 7/06* | (2006.01) |
| *F04B 1/00* | (2006.01) |
| *G05F 1/00* | (2006.01) |

(52) U.S. Cl.
CPC .............. *H02P 7/2855* (2013.01); *F04B 1/00* (2013.01); *G05F 1/00* (2013.01); *H02K 7/061* (2013.01)

(58) Field of Classification Search
CPC ................................ H02P 6/182; H02P 25/032
See application file for complete search history.

(56) References Cited

U.S. PATENT DOCUMENTS

| | | | | |
|---|---|---|---|---|
| 5,015,939 | A * | 5/1991 | Konecny | H02P 25/08 318/701 |
| 9,467,085 | B1 * | 10/2016 | Murata | H02P 25/026 |
| 10,179,346 | B2 * | 1/2019 | Kutej | B06B 1/0261 |
| 2013/0264973 | A1 * | 10/2013 | Garg | H02P 6/182 318/130 |
| 2015/0137713 | A1 * | 5/2015 | Barsilai | H02P 25/032 318/114 |
| 2015/0204925 | A1 * | 7/2015 | Hernandez | G01R 27/02 702/65 |
| 2017/0063273 | A1 * | 3/2017 | Murata | H02P 25/06 |

OTHER PUBLICATIONS

Co-pending U.S. Appl. No. 15/464,547, filed Mar. 21, 2017, "An Apparatus and Method for Controlling an Oscillating Device," by David Eke et al., 43 pgs.

\* cited by examiner

*Primary Examiner* — Bickey Dhakal
(74) *Attorney, Agent, or Firm* — Saile Ackerman LLC; Stephen B. Ackerman (57) ABSTRACT

An apparatus and method for adjusting an amplitude of a drive signal applied to a device are presented. The method of driving a device includes providing a drive signal to drive the device, monitoring a gradient value of the response signal; and changing an amplitude level of the drive signal based on the gradient value. The monitoring of the gradient value includes sensing an electrical parameter of the response signal and calculating the gradient value based on the electrical parameter.

18 Claims, 9 Drawing Sheets

APPARATUS AND METHOD FOR CONTROLLING A DEVICE

This application is a continuation-in-part of U.S. application Ser. No. 15/464,623, filed on Mar. 21, 2017, assigned to a common assignee, and which is herein incorporated by reference in its entirety.

This application is related to U.S. application Ser. No. 15/464,547, filed on Mar. 21, 2017, assigned to a common assignee, and which is herein incorporated by reference in its entirety.

TECHNICAL FIELD

The present disclosure relates to an apparatus and methods for controlling a device. In particular, the present invention relates to an apparatus and method for adjusting an amplitude of a drive signal applied to the device.

BACKGROUND

A large number of devices are operated with a drive signal. Such devices may include among others haptic actuators, speakers and crystal oscillators. Haptic actuators are commonly used with electronic devices to provide the user with a sensory signal also referred to as haptic feedback. For example, mobile phones are often equipped with a haptic actuator which vibrates to provide a notification for a user upon the arrival of a text message or other similar event. To this end different types of haptic actuators have been developed, among which are piezo-electric actuators, the eccentric rotating mass, ERM, and the linear resonant actuator, LRA.

LRAs are based on an inductive coil (solenoid) coupled to a spring holding a permanent magnet. In operation, the spring and mass system move along a single axis. When a current is passing in one direction through the coil it creates a magnetic field that repels the magnet. When passing the current in the other direction the magnetic field attracts the magnet. Hence, the transfer of energy between the spring and the coil generates oscillations. The system has a mechanical resonance frequency typically in the range of 50-300 Hz. At the resonant frequency, the push-pull drive voltage produces the maximum linear deviation of the sprung mass.

Following Lenz's law, upon oscillation of the mass, a back electromotive force, BEMF, is generated across the actuator that opposes the voltage of the source that created it. When the mass moves through the coil it follows a simple harmonic motion, which causes it to induce a sinusoidal voltage in the solenoid. This BEMF is strongest at the resonance frequency of the system.

The BEMF is proportional in the first order to a drive signal driving the LRA. However, the BEMF amplitude is dependent on the weight and strength of the magnet and the number of turns of the solenoid coil. This means that the BEMF varies across LRAs and across temperature and other electro-mechanical parameters.

The mass of the LRA can be accelerated or decelerated by varying the parameters of a drive signal driving the actuator such as the amplitude and the phase of the signal. In this way, a desired user feedback can be achieved. However, the LRA does not respond immediately to a change in amplitude of the drive signal but instead provides a low-pass filter. The rate of acceleration is proportional to the driving power. Hence, it is possible to improve the response of the LRA by overdriving it for a short period of time.

Current practice uses overdriving to accelerate and retard the LRA's oscillations. The level to which a system can be overdriven will depend on the characteristics of the LRA including its resonant impedance, and response time. However, while overdriving allows the LRA to reach a desired amplitude of oscillation more quickly, it is often difficult to know when to stop the overdriving.

Current approaches require calibrating the system for a specific haptic actuator based on its BEMF response, so that the haptic actuator response to a particular level of driving signal is known. This limits the use of the system to a specific actuator and requires a relatively complex system.

SUMMARY

It is an object of the invention to address one or more of the above-mentioned limitations. According to a first aspect of the disclosure, there is provided a method of driving a device adapted to provide a response signal, the method comprising providing a drive signal to drive the device; monitoring a gradient value of the response signal; and changing an amplitude level of the drive signal based on the gradient value.

Optionally, the response signal evolves asymptotically towards a response level. For example, the response level may be proportional to a drive level of the drive signal.

Optionally, the amplitude of the drive signal is variable between a first level, a second level and a third level; the third level having an absolute value greater than an absolute value of the second level; the method comprising changing the amplitude of the drive signal from the first level to the third level, and monitoring a gradient of the response signal to obtain a first gradient value; calculating a final gradient value based on the first gradient value; and changing the amplitude of the drive signal from the third level to the second level upon identifying that the gradient has reached the final gradient value.

Optionally, calculating the final gradient value comprises calculating a coefficient based on the second level and the third level. For example, the coefficient may be defined as a ratio of a difference between the third level and the second level, over a difference between the third level and the first level.

Optionally, the final gradient value is defined by a product of the first gradient value with the coefficient.

Optionally, monitoring the gradient value comprises sensing an electrical parameter of the response signal; and calculating the gradient value based on the electrical parameter. For example, the sensed electrical parameter may be a direct voltage measured across the device or a representation of the voltage such as a filtered value of the voltage. In another example the sensed electrical parameter may be a direct current or a representation of the current such as a filtered value of the current.

Optionally, the response signal comprises a feedback component. For example, the feedback component may be a back-electromotive force component.

According to a second aspect of the disclosure there is provided a controller for use with a driver for proving a drive signal to a device, wherein the device is adapted to provide a response signal; the controller comprising a gradient calculator adapted to calculate a gradient value of the response signal; and a selector coupled to the gradient calculator, for selecting an amplitude level of the drive signal; the controller being adapted change the amplitude of the drive signal using the selector, based on the gradient value.

Optionally, the response signal evolves asymptotically towards a response level.

Optionally, the selector may be adapted to select the amplitude level between a first level, a second level and a third level; the third level having an absolute value greater than the absolute value of the second level.

Optionally, the gradient calculator may be adapted to calculate a first gradient value of the response signal upon a change of amplitude of the drive signal from the first level to the third level; and to calculate a final gradient value based on the first gradient value, wherein the controller is adapted to change the amplitude of the drive signal from the third level to the second level upon identifying that the gradient has reached the final gradient value.

Optionally, the controller comprises a comparator coupled to the gradient calculator and to the selector, the comparator being adapted to compare a gradient value of the response signal with the final gradient value and to provide a control signal to the selector based on the comparison.

Optionally, the gradient calculator may be adapted to calculate the final gradient value by calculating a coefficient based on the second level and the third level.

Optionally, the final gradient value may be defined by a product of the first gradient value with the coefficient.

Optionally, the response signal comprises a feedback component.

Optionally, the controller comprises a drive level calculator coupled to the selector, the drive level calculator being adapted to calculate the third level based on the second level. For example, the drive level calculator may calculate the third level as the second level plus a percentage of a difference between the second level and the first level.

According to a third aspect of the disclosure, there is provided a control system for use with a device adapted to provide a response signal, the control system comprising a driver adapted to provide a drive signal to the device; wherein the drive signal comprises an amplitude; a sensor adapted to sense an electrical parameter of the response signal; and a controller coupled to the sensor and to the driver, the controller comprising a gradient calculator adapted to calculate a gradient value of the response signal based on the electrical parameter; and a selector coupled to the gradient calculator, for selecting an amplitude level of the drive signal; the controller being adapted to change the amplitude of the drive signal using the selector, based on the gradient value.

Optionally, the response signal evolves asymptotically towards a response level.

Optionally, the device comprises a resonance frequency, and the control system comprises a frequency controller adapted to adjust the drive signal to drive the device at the resonance frequency.

Optionally, the driver may be a current driver to provide a current signal, and the sensor may be a voltage sensor to sense a voltage across the oscillating device.

The control system according to the third aspect of the disclosure may comprise any of the features described above in relation to the controller according to the second aspect of the disclosure.

According to a fourth aspect of the disclosure, there is provided a system comprising a device adapted to provide a response signal, and a control system, the control system comprising a driver adapted to provide a drive signal to the device; wherein the drive signal comprises an amplitude; a sensor adapted to sense an electrical parameter of the response signal; and a controller coupled to the sensor and to the driver, the controller comprising a gradient calculator adapted to calculate a gradient value of the response signal based on the electrical parameter; and a selector coupled to the gradient calculator, for selecting an amplitude level of the drive signal; the controller being adapted change the amplitude of the drive signal using the selector, based on the gradient value.

The system according to the fourth aspect of the disclosure may comprise any of the features described above in relation to the control system according to the third aspect of the disclosure.

BRIEF DESCRIPTION OF THE DRAWINGS

The invention is described in further detail below by way of example and with reference to the accompanying drawings, in which.

DESCRIPTION

Figure 1:
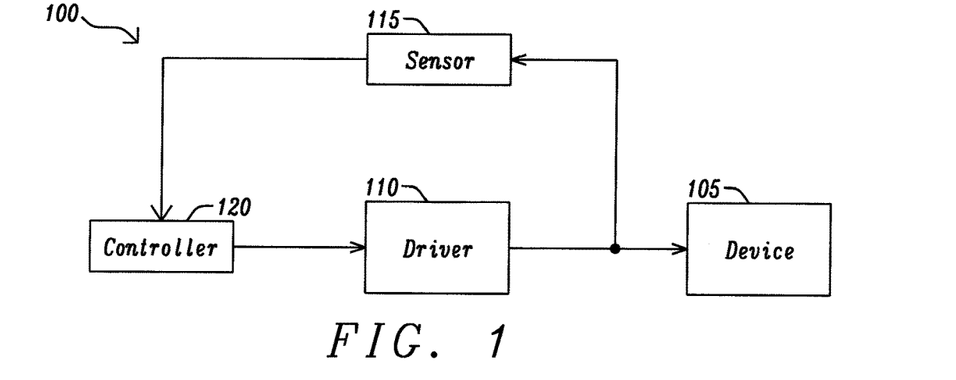
FIG. 1 is a diagram of a system for driving a device.

FIG. 1 illustrates a system 100 for controlling a device 105 using a drive signal. The device may be an RC circuit or a mechanical system that can be modelled as an RC circuit. The device may be an oscillating device arranged to provide inductive or capacitive oscillations. The device can also be a mechanical arrangement including a sprung magnet. For example, the device may be a speaker, a crystal oscillator, or a haptic actuator such as a linear resonant actuator LRA, or an eccentric rotating mass, ERM. The device could also be a voltage reference receiving a current signal and providing a voltage output that depends on the R-C characteristics of the voltage reference circuit.

The system 100 comprises a driver 110, a sensor 115, and a controller 120. The driver 110 is adapted to provide a drive signal to the device 105. The sensor 115 and the controller 120 form a feedback loop that may be used to change or adjust the drive signal driving the device 105.

Figure 2:
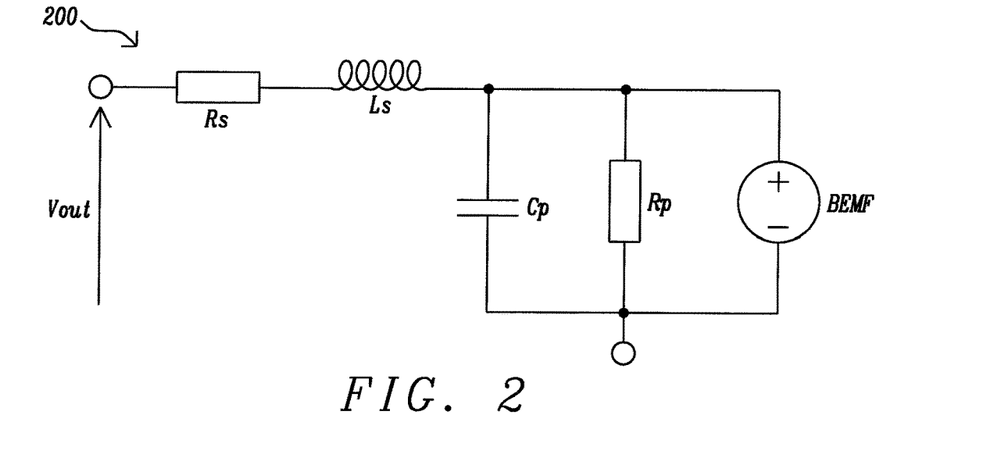
FIG. 2 is a diagram of an electrical system for modelling an ERM.

FIG. 2 shows an electrical system 200 for modelling an ERM. An ERM uses an off-center mass DC motor which rotates at a speed that is proportional to an applied voltage across it. As the applied voltage increases, the frequency and amplitude of the ERM increases. An ERM can be modelled as a resistor Rs in series with an inductor Ls, and a voltage source representing the BEMF.

The BEMF is proportional to the speed of rotation of the motor. In other words, the frequency of rotation is directly proportional to the back electromotive force generated across the motor. The output voltage can be expressed as:

$$V_{out} = IR + L\frac{di}{dt} + V_{BEMF} \quad (1)$$

where I is a current drive, R is the resistance of the ERM, L is the inductance of the ERM and $V_{BEMF}$ is the back-EMF voltage.

Figure 3:
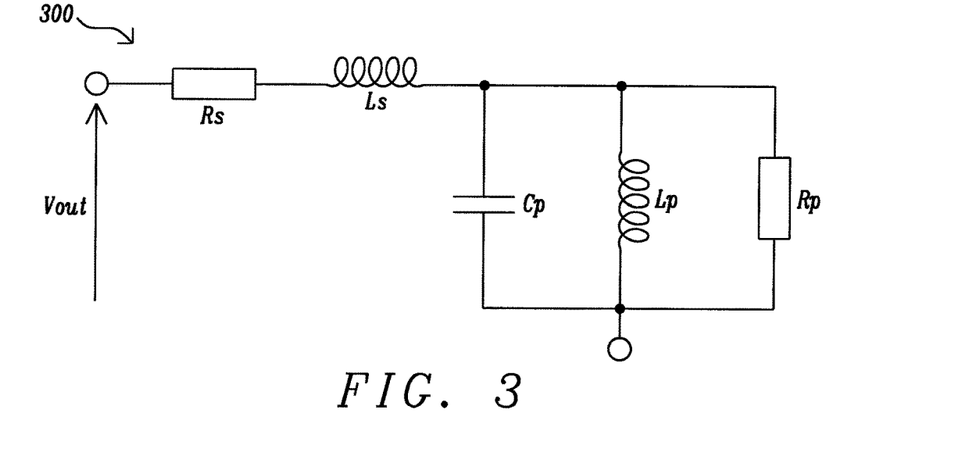
FIG. 3 is a diagram of an electrical system for modelling a LRA.

FIG. 3 shows an electrical system for modelling a LRA. The LRA is modelled as a first resistor Rs in series with a first inductor Ls combined with a second resistor Rp in parallel with a second inductor Lp and a capacitor Cp. The damped oscillating motion of the system formed by the spring and the magnetic mass of the LRA is represented by the components Rp, Lp and Cp. The components Rs and Ls are used to represent the electrical behavior of the internal coils (solenoid) used to attract and repel the mass of the LRA.

The circuit 300 will resonate at a frequency primarily dependent on the values of Cp and Lp. Providing the filtering effect of Rs and Ls is significantly above the resonance of the circuit then the current and voltage at resonance will be dependent purely of the sum of the resistances Rs and Rp. When driven with a drive signal approaching the resonant frequency, a LRA will resonate and produce a back electromotive force, BEMF, proportional in amplitude to the drive signal. The amplitude will build up following a low-pass filter response describing an exponential decay tending towards the final value.

Haptic systems such as ERMs and LRAs vary the amplitude of the drive signal to provide the desired user feedback. In the case of ERMs the drive signal is a simple amplitude envelope. In the case of LRAs the drive signal is formed by an amplitude envelope modulated by the resonance frequency of the LRA. Due to the mechanical nature of ERMs or LRAs, the BEMF signal of ERMs and LRAs do not respond immediately to a change in amplitude of the drive signal.

Figure 4:
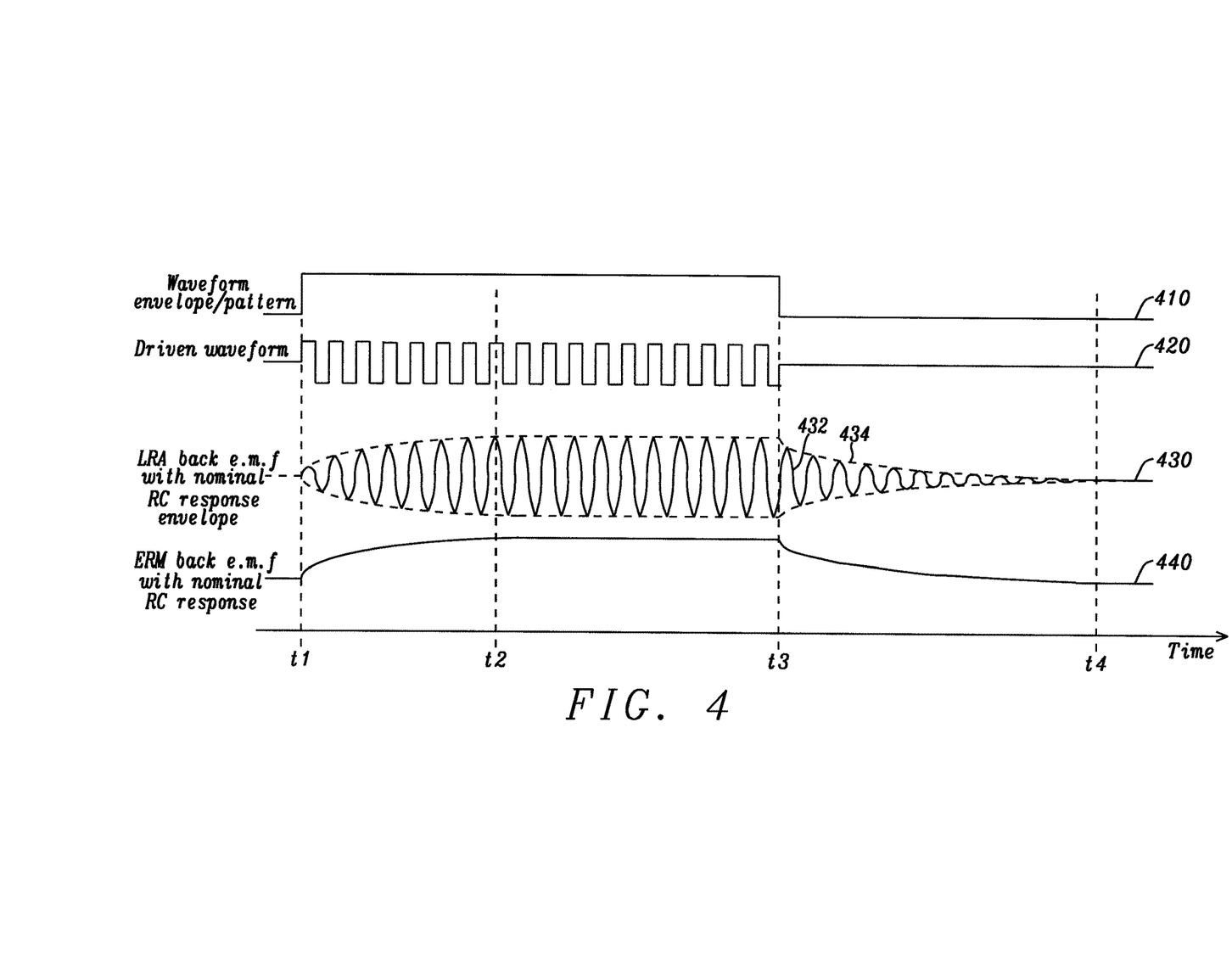
FIG. 4 is a time chart illustrating the waveforms of a drive envelope signal, a drive signal and a response signal including a back electromotive force BEMF signal.

FIG. 4 illustrates the waveforms of a drive envelope signal 410; a drive signal 420; a LRA response signal 430 and an ERM response signal 440. The drive envelop signal 410 modulates the amplitude of the drive signal 420. In this example, the drive signal 420 is turned on at time t1 and turned off at time t3. The response signal 430 of the LRA comprises a BEMF signal 432 modulated by an envelope 434.

After time t1, the positive portion of the envelope 434 starts increasing gradually, to reach a maximum target amplitude at time t2. Between times t2 and t3 the maximum amplitude of the envelope signal 434 remains constant. At time t3 the amplitude of the envelope signal 434 starts decreasing to reach its minimum target value at time t4. Similarly, the response signal 440 of the ERM starts increasing at time t1, reach the target amplitude level at time t2, then starts decreasing from time t3 to reach a minimum value at time t4.

The acceleration rate of ERMs or LRAs is proportional to the drive power. As a result, ERMs and LRAs can be overdriven until the required level is achieved. This permits to reach the desired amplitude more rapidly and makes the ERM or LRA's response signal resemble more closely the amplitude of the drive signal.

Figure 5:
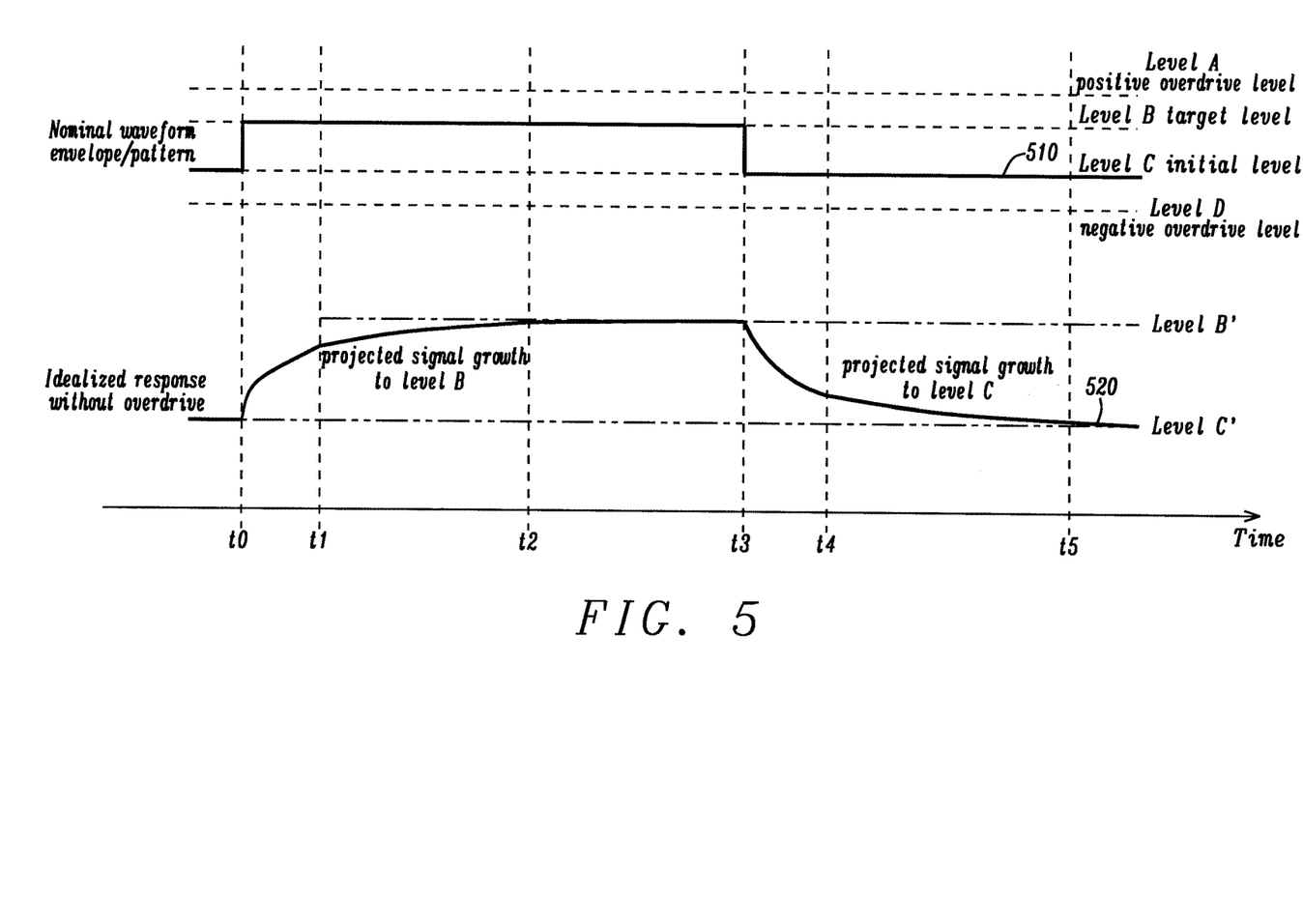
FIG. 5 is a time chart showing the variation of a response signal of a haptic actuator controlled without overdrive.

FIG. 5 shows the waveform of a drive signal 510 and the corresponding response signal (BEMF) 520 for an ERM. In this example, no overdrive has been applied to the ERM.

The drive signal 510 has an amplitude that is variable between four different levels marked level A, level B, level C and level D. The first level, level C is the initial amplitude level. Level B is the target amplitude level. The level B is proportional to a level B' that the response signal 520 is expected to reach after a certain time. Level A is a level greater than the target level B and is referred to as the first overdrive level. Level D is a level lower than the initial level C and is referred to as the second overdrive level. In FIG. 5 the drive signal 510 varies between the initial level C and the target level B.

The response signal 520 has an amplitude which varies between an initial level C' and a response target level B'. The response target level B' is proportional to the target level B. For example, if the level B of the drive signal is 10V, the level B' of the response signal may be 5V or 10 mV.

At time t0, the drive signal 510 increases from the initial level, level C, to the target level, level B. Between the times t0 and t3, the drive signal remains at the level C. At time t0, the response signal 520 starts increasing from level C' to level B' asymptotically. However, this increase does not occur instantly; in this example, the response signal reaches the level B' at time t2.

At time t3 the drive signal 510 decreases from level B to level C. Similarly, the response signal 520 does not respond instantly to this change. At time t3 the response signal 520 starts decreasing slowly to reach level C' asymptotically at time t5.

Figure 6:
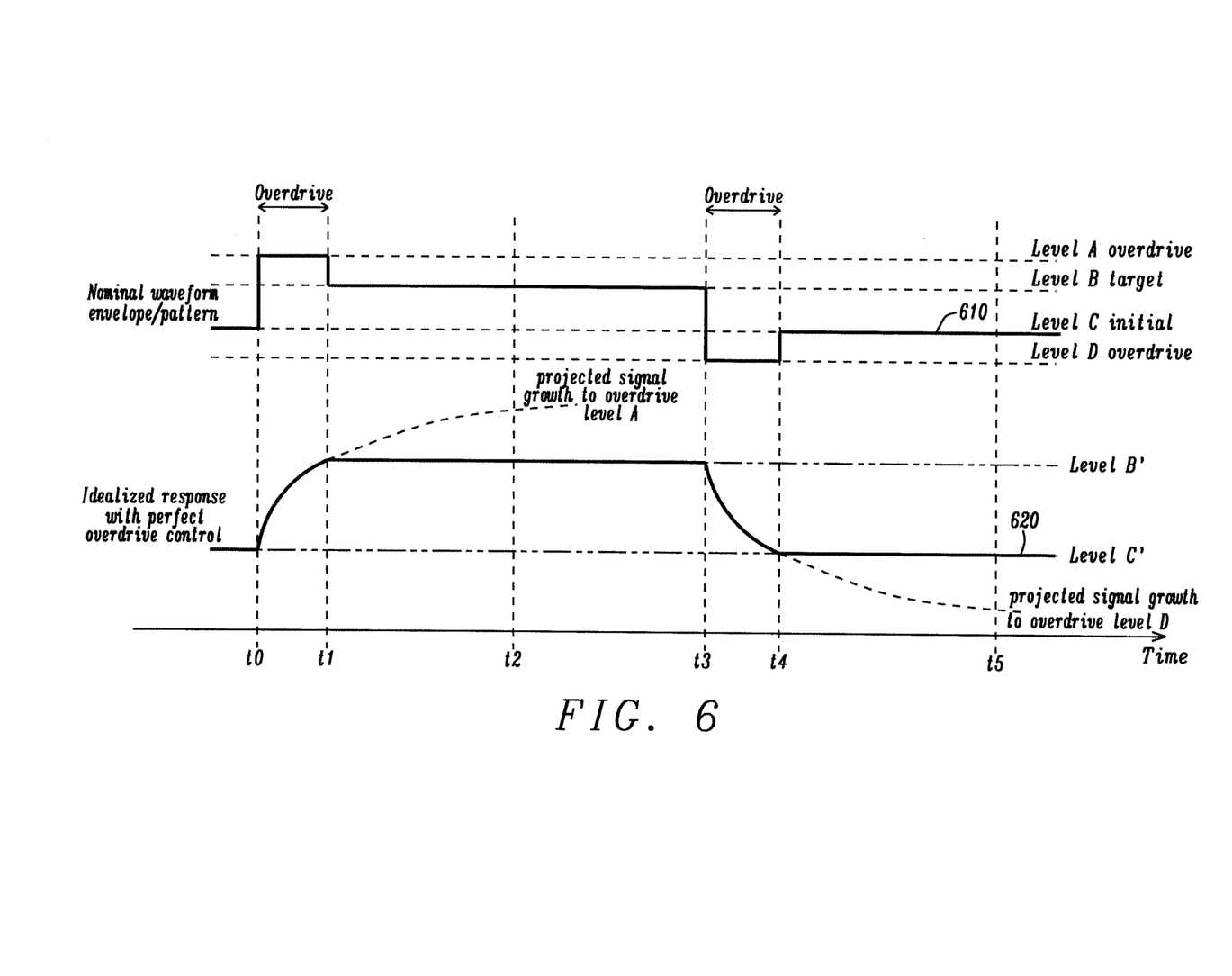
FIG. 6 is a time chart showing the variation of a response signal of a haptic actuator controlled with an ideal overdrive.

FIG. 6 shows the waveform of a drive signal 610 and the corresponding response signal (BEMF) 620 from the ERM. In this example, an overdrive has been applied to the ERM. In FIG. 6 the drive signal varies between the four levels A, B, C and D and the response signal varies between the levels C' and B' as described with respect to FIG. 5.

At time t0, the drive signal 610 increases from the initial level C, to the first overdrive level A. Between the times t0 and t1, the drive signal remains at the overdrive level A. Between the times t0 and t1, the response signal 620 increases from level C' to the target level B'. Therefore, in this example, the response signal reaches the response target level B' at time t1, which is faster compared to the previous example in which no overdrive was applied.

Between t1 and t3, the drive signal 610 remains constant at the level B and the response signal 620 remains constant at the response target level B'. At time t3, the drive signal 610 decreases sharply from level B to the second overdrive level D. Between times t3 and t4, the response signal 620 decreases from level B' to level C'. At time t4, the drive signal 610 increases from the second overdrive level D to the initial level C. Between t4 and t5 the response signal 620 remains constant at level C'.

In the example of FIG. 6, the drive signal 610 maintains the first overdrive level A for an ideal length of time between t0 and t1, allowing to the response signal 620 to reach the response target level B' at the desired time t1, without overshooting above the level B'. Similarly, the drive signal 610 maintains the second overdrive level D for an ideal length of time between t3 and t4, allowing the response signal 620 to return to initial level C' at the desired time t4, without undershooting below the initial level.

The level to which a system can be overdriven will depend on the characteristics of the RC device. When the RC device is an LRA such characteristics may include the LRA resonant impedance, and its response time. Current applications apply an overdrive for a predefined fixed duration. This require calibrating the system for a specific haptic actuator based on its BEMF response, so that the haptic actuator response to a particular level of driving signal is known. This limits the use of the system to a specific actuator and requires a relatively complex system. Variations in the characteristics of the haptic actuator depending on operating conditions or ageing will also cause errors in the overdrive time.

Figure 7:
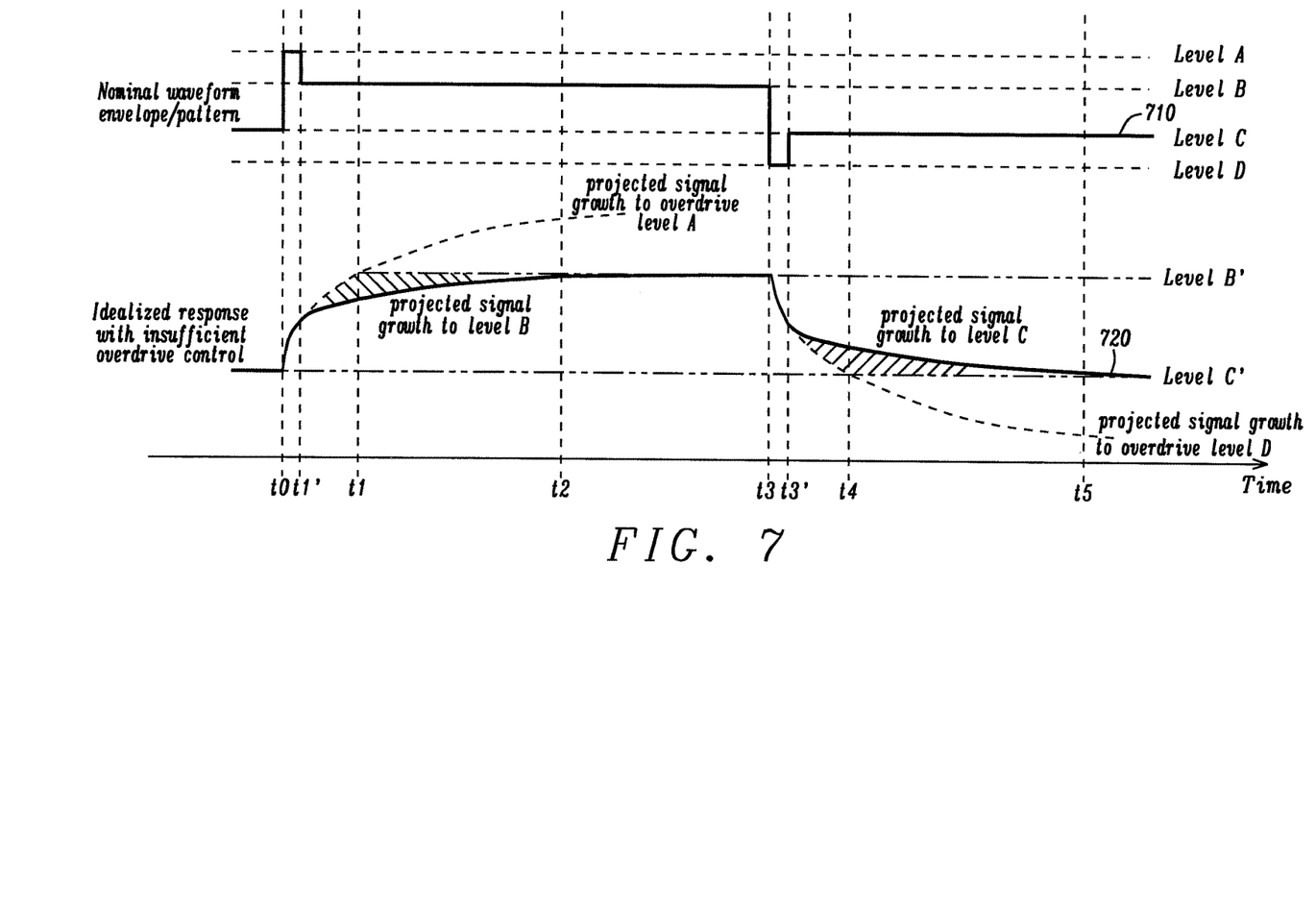
FIG. 7 is a time chart showing the variation of a response signal of a haptic actuator controlled with a short overdrive.

FIG. 7 shows a drive signal 710 and the corresponding response signal (BEMF) 720. In this case, the overdrive time is too short to achieve the response target level B' at the desired time t1.

Between times t0 and t1', the drive signal 710 maintains the first overdrive level A. At times t1' and t1 the response signal 720 is lower than the response target level B'. The response signal 720 only reaches the level B' at time t2.

Between times t3 and t3', the drive signal 710 maintains the second overdrive level D. At times t3' and t4 the response signal 720 is higher than the initial level C'. The response signal 720 only reaches the initial level C' at time t5.

Figure 8:
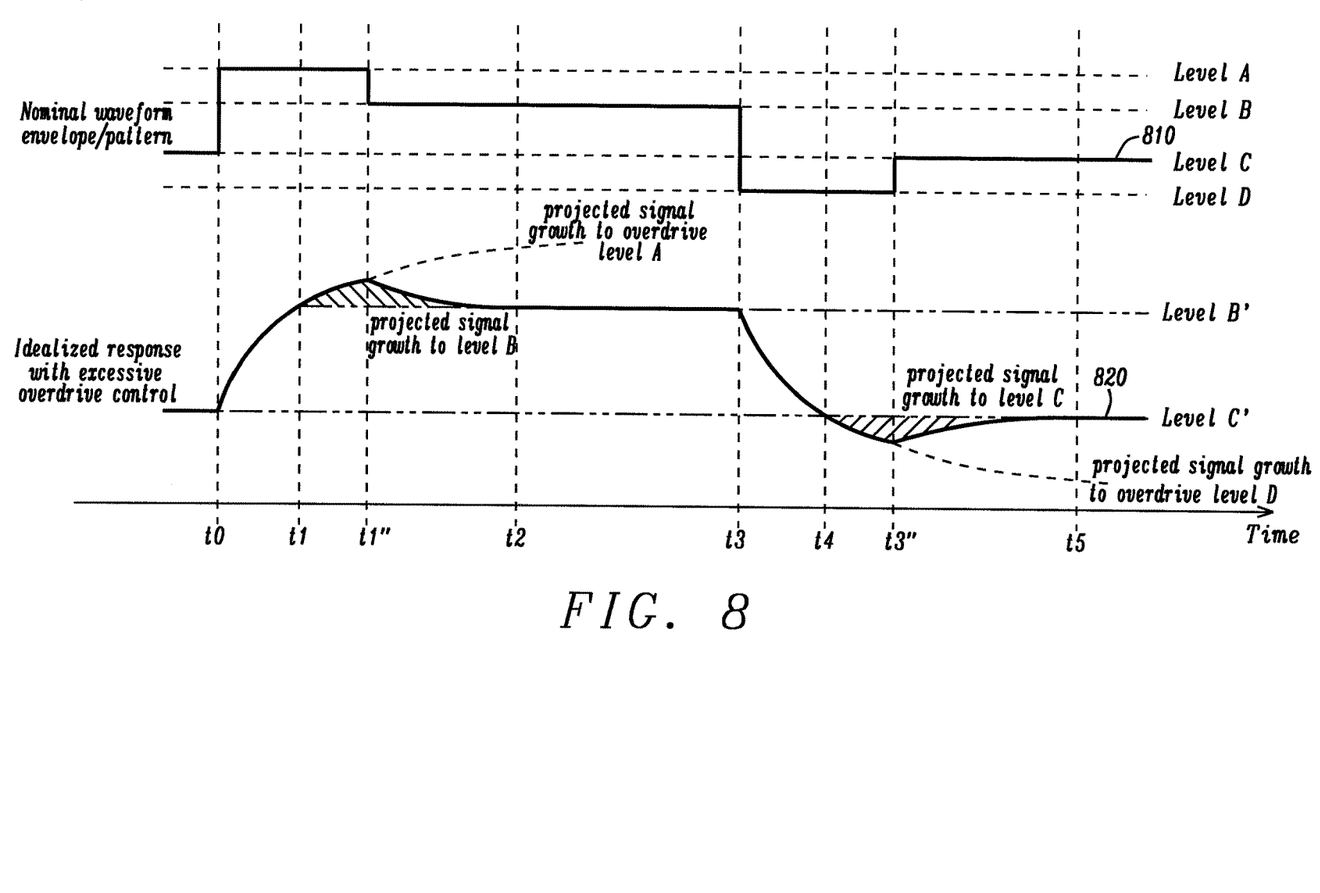
FIG. 8 is a time chart showing the variation of a response signal of a haptic actuator controlled with a long overdrive.

FIG. 8 shows a drive signal 810 and the corresponding response signal (BEMF) 820. In this case, the overdrive time is too long to achieve the response target level B' at the desired time t1.

Between times t0 and t1", the drive signal 810 maintains the first overdrive level A. At times t1, the response signal 820 has reached the response target level B', however the amplitude of the response signal 820 keeps increasing until time t1", at which point the response signal decreases to return to the response target level B' at time t2.

Between times t3 and t3", the drive signal 810 maintains the second overdrive level D. At times t4, the response signal 820 has reached the initial level C', however the amplitude of the response signal 820 keeps decreasing until time t3", at which point the response signal increases to return to the initial level C' at time t5.

Figure 9:
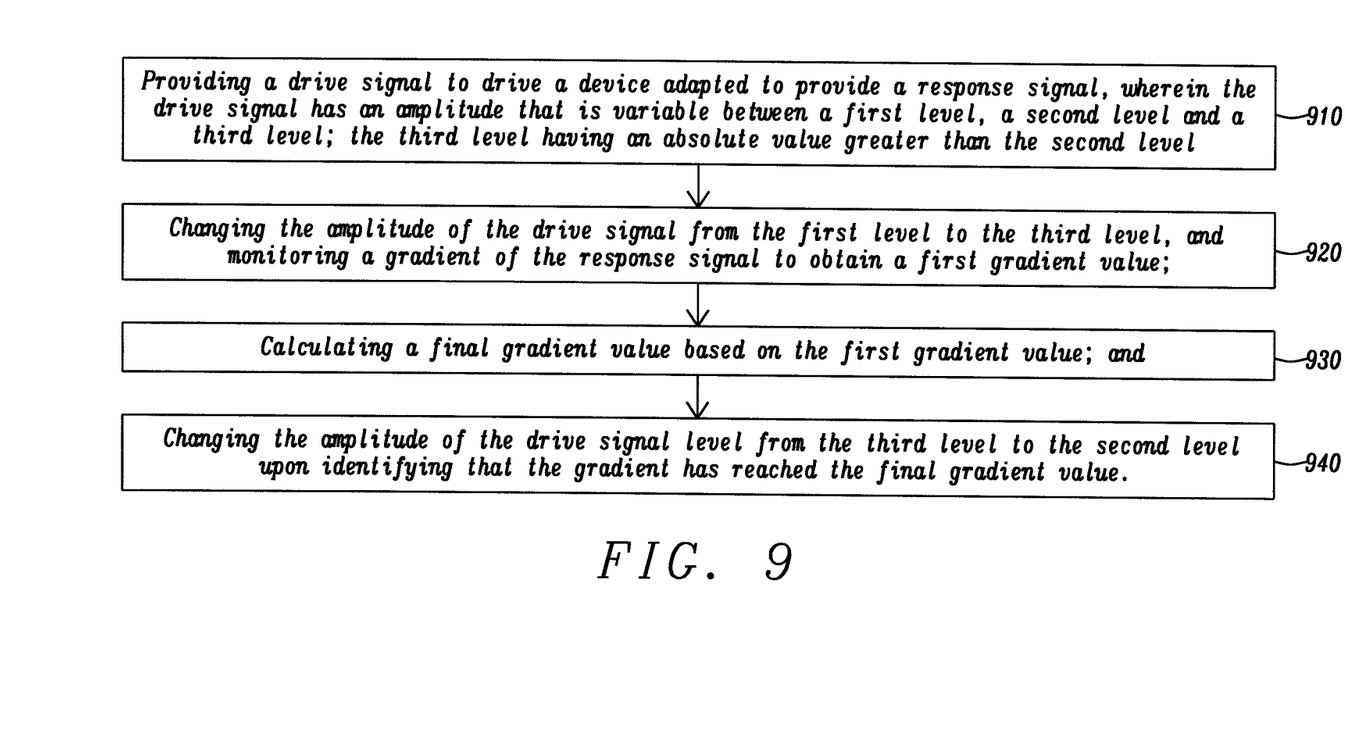
FIG. 9 is a flow chart of a method for operating a device.

FIG. 9 illustrates the steps of a method for driving a device adapted to provide a response signal. The method may be applied to different types of devices, for instance devices which provide a response signal that varies asymptotically towards an amplitude value. For example, the device may be an RC circuit or a mechanical system that can be modelled as an RC circuit. For instance, the device may be a haptic actuator such as an LRA or an ERM. The device could be a voltage reference receiving a current signal and providing a voltage output that depends on the R-C characteristics of the voltage reference circuit.

The method is based on monitoring a gradient value of the response signal and changing a value of the drive signal based on the gradient value. Monitoring a gradient value of the response signal may include monitoring a gradient value of an envelope of the response signal. If the envelope has a positive and a negative portion the negative portion of the envelope may be rectified before calculating the gradient.

At step 910 a drive signal is provided to drive the device. The response signal may be a voltage having feedback component such as a BEMF component. The drive signal has an amplitude that is variable between a first level also referred to as initial level, a second level also referred to as target level and a third level, also referred to as overdrive level. The third level has an absolute value greater than the absolute value of the second level.

The third (overdrive) level may be defined as the target level plus a percentage of a difference between the second (target) level and the first (initial) level. For example, considering a positive overdrive level, if the initial level is 0V, and the target level is 1V, the overdrive level may be chosen to be the target level plus 50% of the difference between the target level (1V) and the initial level (0V). In this case, the overdrive level would be 1.5V. Similarly, considering a negative overdrive level, if the initial level is 1V, and the target level is −1V, the overdrive level may be chosen to be −1V plus 100% of the difference between the target level (−1V) and the initial level (1V). In this case, the overdrive level would be −1+100%(−1−1)=−3V.

At step 920, the amplitude of the drive signal is changed from the first (initial) level to the third (overdrive) level, and a gradient of the response signal is monitored to obtain a first gradient value. For instance, monitoring the gradient value of the response signal may include monitoring a gradient of the envelope of the response signal.

At step 930, a final gradient value is calculated based on the first gradient value. For example, the final gradient may be calculated as a product of the first gradient with a coefficient that is a function of the first level, the second level and the third level.

At step 940, the amplitude of the drive signal is changed from the third level to the second level upon identifying that the gradient has reached the final gradient value.

Figure 10:
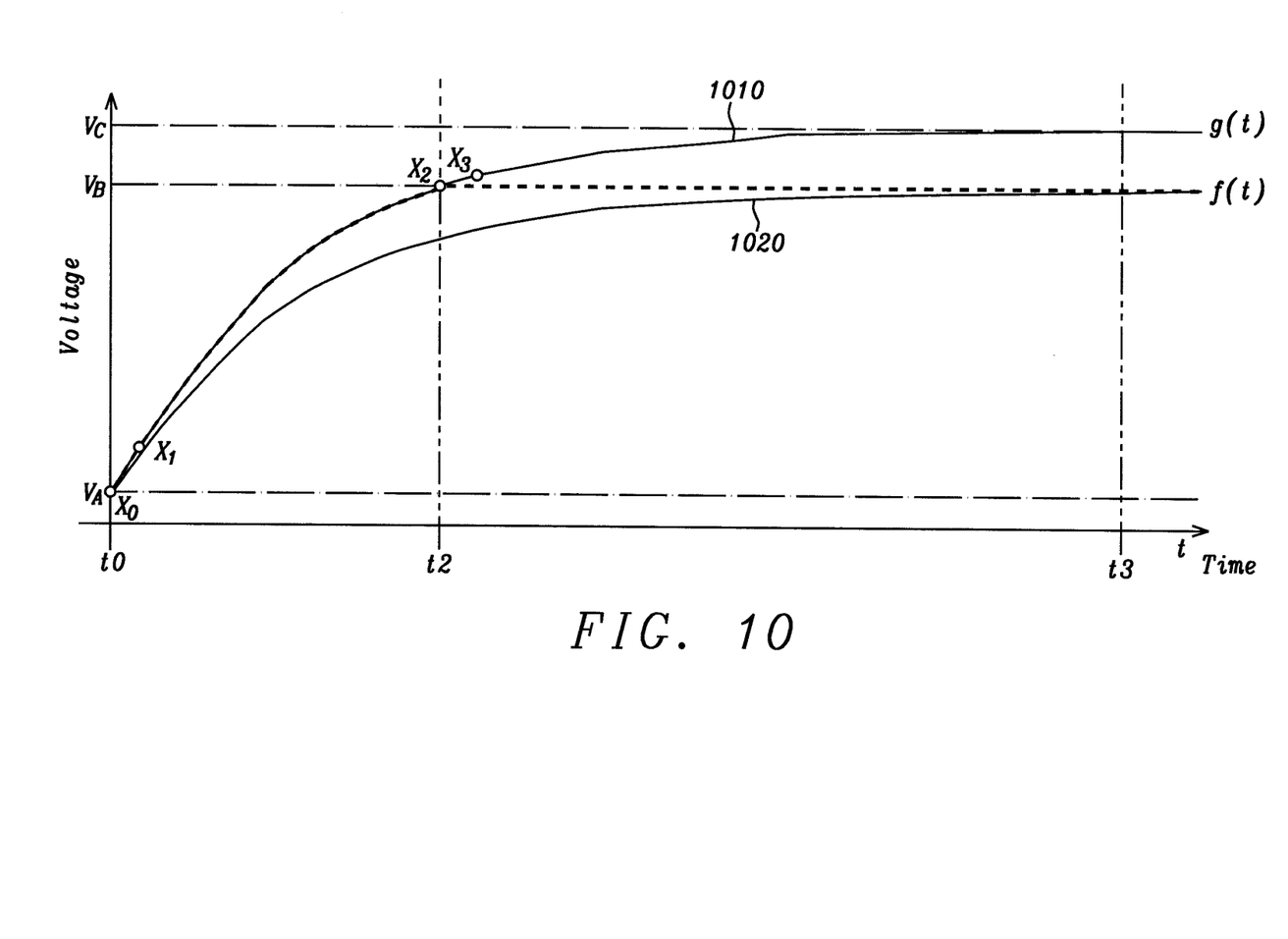
FIG. 10 is a representation of two asymptotic functions.

FIG. 10 illustrates two asymptotic functions g(t) 1010 and f(t) 1020. The function g(t) represents the response signal of a device when the drive signal applied to the device has an amplitude level set to an overdrive level L3. Similarly, the function f(t) represents the response signal of a device when the drive signal has an amplitude level set to a target level L2. The functions g(t) and f(t) are defined as follows:

$$g(t)=(V_C-V_A)\cdot(1-e^{-t})+V_A \quad (2)$$

$$f(t)=(v_B-v_A)\cdot(1-e^{-t})+V_A \quad (3)$$

The function g(t) has an initial value $V_A$ at time t0 and tends to the voltage value $V_C$ asymptotically such that g(t∞)=$V_C$. In first approximation, it is considered that the function g(t) reaches $V_C$ at time t3. Similarly, the function f(t) has an initial value $V_A$ and tends to the voltage value $V_B$ asymptotically.

The level $V_B$ may be proportional to the level L2 and the level $V_C$ may be proportional to the level L3. The degree of proportionality between these levels depends on the characteristics of the device itself.

If the value $V_B$ is the response target level, the function g(t) will reach the target value $V_B$ at a time t2, while the function f(t) will reach $V_B$ at a later time t3. A mathematical relationship can be established between the gradient of the function g(t), and the levels $V_A$, $V_B$ and $V_C$, of the response signal as follows:

$$g'(t2) = P \cdot g'(t0) \quad (4)$$

$$P = \left(1 - \frac{V_B - V_A}{V_C - V_A}\right) = \frac{V_C - V_B}{V_C - V_A} \quad (5)$$

In which g'(t2) is the time derivative or gradient of the function g(t) at time t2, and g'(t0) is the time derivative of the function g(t) at time t0. The final gradient g'(t2) is expressed as the product of the initial gradient g'(t0) with a coefficient P. The coefficient P is a function of the levels $V_A$, $V_B$ and $V_C$ of the functions f(t) and g(t). However, the coefficient P can also be expressed as a function of the initial level L1, the target level L2 and the overdrive level L3 of the drive signal as follows:

$$P = \left(1 - \frac{L_2 - L_1}{L_3 - L_1}\right) = \frac{L_3 - L_2}{L_3 - L_1} \quad (6)$$

The coefficient P may be defined as the ratio of a difference between the overdrive level L3 and the target level L2, over a difference between the overdrive level L3 and the initial level L1.

Equations (4) and (6) can be used to determine a gradient value (t2) corresponding to a situation in which the response signal has reached a desired target level $V_B$. This allows driving a device with an overdrive level for an accurate duration before changing the amplitude of the drive signal to the target level. As a result, it is possible to drive the haptic actuator at the desired target level faster without the need for calibration.

If the overdrive level L3 is 150% larger than the target level L2, then the factor P=⅓. In other words, the final gradient value g'(t2) is one third of the initial gradient value g'(t0). If the overdrive level L3 is 200% larger than the target level L2, then the factor P=½. The larger the overdrive percentage, the closer the response signal will be to the envelope signal.

Figure 11:
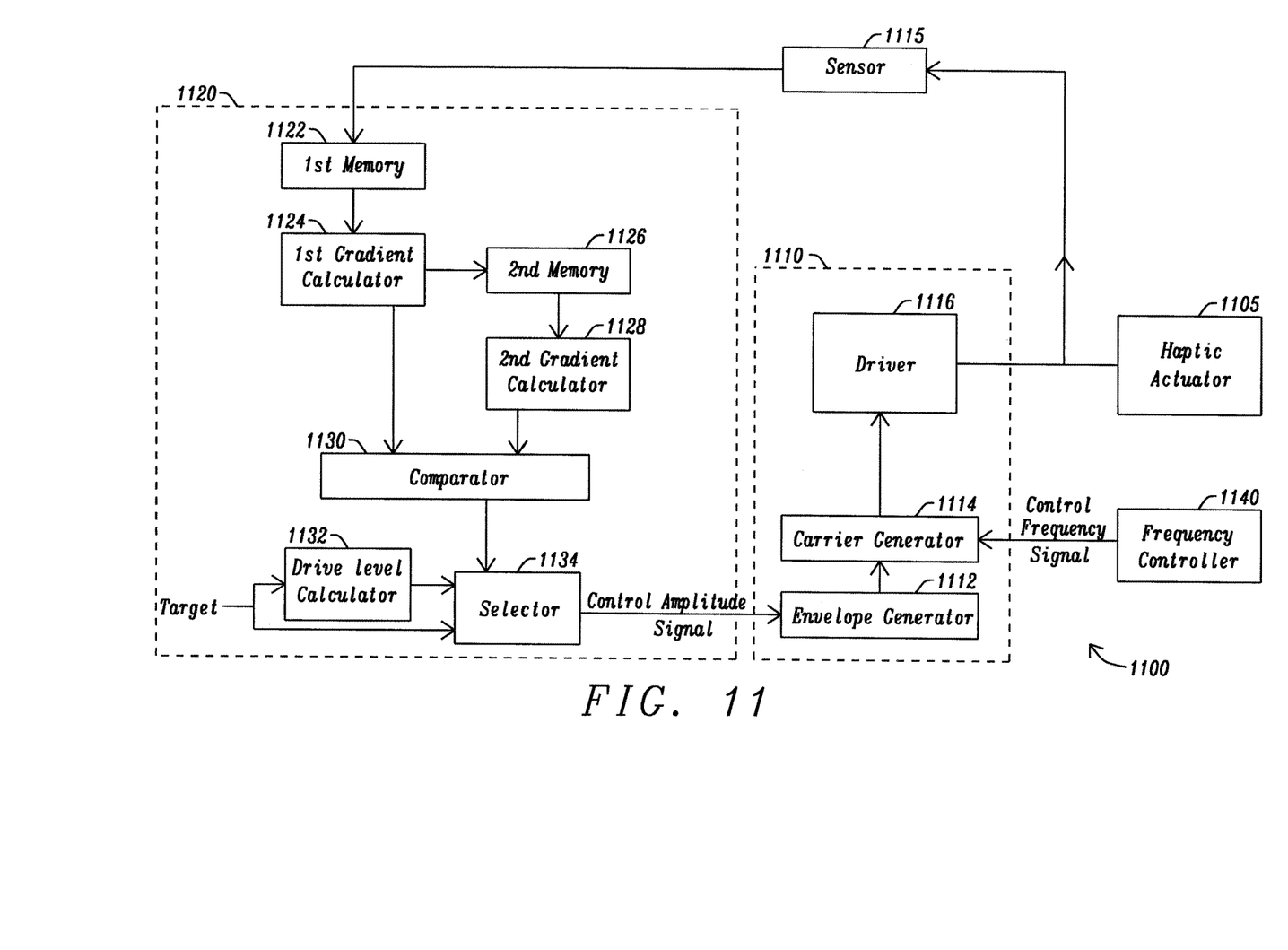
FIG. 11 is a diagram of a haptic system provided with an overdrive controller.

FIG. 11 shows a system 1100 comprising a device 1105, a sensor 1115, a regulator 1110 and a controller 1120, also referred to as drive level controller. In this example, the device is represented by a haptic actuator, for example an ERM.

The controller 1120 comprises a comparator 1130 coupled to a first and a second gradient calculators 1124 and 1128, and to a drive level selector 1134. A first memory 1122 is coupled between the sensor 1115 and the first calculator 1124; and a second memory 1126 is coupled between the first calculator 1124 and the second calculator 1128. The memories 1122 and 1126 may be provided by a digital storage element such as a register.

The first gradient calculator 1124 has an input for receiving a measurement value from the memory 1122 and two outputs for providing a gradient value to the second memory 1126 and to the comparator 1130 respectively. The first gradient calculator 1124 may be provided by a subtractor.

The second calculator 1128 has an input for receiving a first gradient value, also referred to as initial gradient value from the memory 1126. The second calculator also has an output for providing a second gradient value, also referred to as stop or final gradient value to the comparator 1130. The second gradient calculator 1128 is adapted to calculate the stop or final gradient based on a mathematical formula. For instance, the second gradient calculator may be provided by an arithmetic logic unit ALU. The ALU may be used to perform multiplications and divisions based logical shift of binary values. This approach is advantageous as it only requires a few logic elements and hence has a small footprint.

The comparator 1130 has a first input for receiving a present gradient value from the first calculator 1124, a second input for receiving the final or stop gradient value from the second calculator 1128 and an output coupled to the selector 1134. The comparator 1130 may be implemented as a digital comparator or an analog comparator.

The controller 1120 also includes a drive level calculator 1132, also referred to as overdrive calculator for calculating an overdrive level. The drive level calculator is coupled to the selector 1134. The drive level calculator has an input for receiving a target drive value, and an output for providing the overdrive level. The drive level calculator 1132 is adapted to provide an overdrive level based on a target level. This may be achieved by multiplying the target value by a constant value. For instance, the drive level may be a percentage of the target level, for example 150% the target level. The drive level calculator may be implemented as a digital multiplier or an analog multiplier.

The selector 1134 has a first input for receiving a target drive value, a second input for receiving the overdrive level, and one output for providing a control signal. The selector 1134 may be a multiplexer. For instance, the selector 1134 may be an analog multiplexer or a digital multiplexer.

In an alternative embodiment, one or more components of the controller 1120 may be combined. For example, the first gradient calculator 1124, the second gradient calculator 1128, and the drive level calculator 1132 may be combined in a single calculator. The first memory 1122 and the second memory 1126, may also be combined in a single memory. The calculator may be implemented either digitally or in analog form or as a combination of digital and analog elements.

The sensor 1115 may be a voltage sensor or a current sensor. For instance, the sensor may be provided by an analog to digital converter ADC. The ADC may be coupled to a preamplifier.

The regulator 1110 may be a current regulator or a voltage regulator. The regulator 1110 has an input for receiving a control signal from the controller 1120 and an output for providing a drive signal such as a drive current signal or a drive voltage signal to the device 1105. The regulator 1110 comprises an envelope generator 1112, a carrier generator 1114 and a driver 1116, such as a current driver or voltage driver. The envelope generator 1112 has an input for receiving the control signal from the selector 1134. The carrier generator 1114 has an input for receiving an amplitude parameter from the envelope generator 1112 and an output for providing a signal to the driver 1116. Optionally, the carrier generator 1114 has another input for receiving a control signal from a frequency controller 1140, to adjust the frequency of the drive signal. The frequency controller 1140 is optional and may be implemented in different fashions. A possible implementation has been described in related U.S. patent application Ser. No. 15/464,547. The driver 1116 has an input for receiving a signal from the carrier generator 1114 and an output for proving the drive signal to the device 1105. The regulator 1110 may be implemented in different fashions. For example, a current regulator may comprise a current driver such as a differential H-bridge, coupled to a current control loop. The current control loop may use for example, a PWM or a linear control technique.

In operation, the sensor 1115 senses an electrical parameter, for example a voltage or a current value, across the haptic actuator. The electrical parameter is then stored in the first memory 1122. The first gradient calculator 1122 receives a plurality of electrical parameter values and calculates a gradient value also referred to as present gradient value. The gradient value changes over time as the response signal of the device increases. When drive signal is applied, the response signal starts increasing, and the gradient value calculated by the gradient calculator is the initial gradient value. The initial gradient value is then sent to the second memory 1126. The second gradient calculator 1128 calculates the stop or final gradient value based on the initial gradient value.

The comparator 1130 receives a present gradient value from the first calculator 1124 and the stop gradient value from the second calculator 1128. The comparator 1130 compares the present gradient value with the stop gradient value and provides a control signal to the selector 1134. The selector 1134 then select a drive level based on the control signal received from the comparator. If the present gradient is greater than the stop gradient value, the comparator 1130 may provide a control signal to select the overdrive level. If the present gradient has reached the stop gradient value, or if the present gradient has gone below the stop gradient value, then the comparator 1130 may provide a control signal to select the target level.

The regulator 1110, then adjusts the drive signal using the control signal from the controller 1120, for example, by changing the amplitude of the drive signal to the selected drive level. The selector 1134 sends a control signal to the envelope generator 1112 that corresponds to the selected drive level. The carrier generator 1114 receives an output from the envelope generator 1112 to control the amplitude of its output signal. The driver 1116 then receives the output from the carrier generator and provides a suitable current or voltage to the device.

A skilled person will appreciate that variations of the disclosed arrangements are possible without departing from the disclosure. Although the system of the disclosure has been described with respect to haptic actuators such as LRAs and ERMs, the system could also be used with other types of devices. For example, the system could be used with a speaker or a voltage reference. Accordingly, the above description of the specific embodiment is made by way of example only and not for the purposes of limitation. It will be clear to the skilled person that minor modifications may be made without significant changes to the operation described.

What is claimed is:

1. A method of driving a device adapted to provide a response signal, the method comprising
    providing a drive signal to drive the device; wherein the drive signal comprises an amplitude;
    wherein the amplitude of the drive signal is variable between a first level, a second level and a third level; the third level having an absolute value greater than an absolute value of the second level;
    changing the amplitude of the drive signal from the first level to the third level, and monitoring a gradient of the response signal to obtain a first gradient value;
    calculating a second gradient value of the response signal when the amplitude of the drive signal is at the third level;
    calculating a final gradient value based on the first gradient value; and
        changing the amplitude of the drive signal from the third level to the second level upon identifying that the second gradient value has reached the final gradient value.

2. The method as claimed in claim 1, wherein the response signal evolves asymptotically towards a response level.

3. The method as claimed in claim 1, wherein calculating the final gradient value comprises calculating a coefficient based on the second level and the third level.

4. The method as claimed in claim 3, wherein the final gradient value is defined by a product of the first gradient value with the coefficient.

5. The method as claimed in claim 1, wherein monitoring the gradient value comprises sensing an electrical parameter of the response signal; and calculating the gradient value based on the electrical parameter.

6. The method as claimed in claim 1, wherein the response signal comprises a feedback component.

7. A controller for use with a driver for proving a drive signal to a device, wherein the device is adapted to provide a response signal; the controller comprising
    a gradient calculator; and
    a selector coupled to the gradient calculator, for selecting an amplitude level of the drive signal; wherein the selector is adapted to select the amplitude level between a first level, a second level and a third level; the third level having an absolute value greater than the absolute value of the second level;
    wherein the gradient calculator is adapted to calculate a first gradient value of the response signal upon a change of amplitude of the drive signal from the first level to the third level; a second gradient value of the response signal when the amplitude of the drive signal is at the third level; and a final gradient value based on the first gradient value, wherein the controller is adapted to change the amplitude of the drive signal from the third level to the second level using the selector upon identifying that the second gradient value has reached the final gradient value.

8. The controller as claimed in claim 7, wherein the response signal evolves asymptotically towards a response level.

9. The controller as claimed in claim 7, comprising a comparator coupled to the gradient calculator and to the selector, the comparator being adapted to compare the second gradient value of the response signal with the final gradient value and to provide a control signal to the selector based on the comparison.

10. The controller as claimed in claim 7, wherein the gradient calculator is adapted to calculate the final gradient value by calculating a coefficient based on the second level and the third level.

11. The controller as claimed in claim 10, wherein the final gradient value is defined by a product of the first gradient value with the coefficient.

12. The controller as claimed in claim 7, wherein the response signal comprises a feedback component.

13. The controller as claimed in claim 7 comprising a drive level calculator coupled to the selector, the drive level calculator being adapted to calculate the third level based on the second level.

14. A control system for use with a device adapted to provide a response signal, the control system comprising
    a driver adapted to provide a drive signal to the device; wherein the drive signal comprises an amplitude;
    a sensor adapted to sense an electrical parameter of the response signal; and
    a controller coupled to the sensor and to the driver, the controller comprising
        a gradient calculator; and
        a selector coupled to the gradient calculator, for selecting an amplitude level of the drive signal; wherein the selector is adapted to select the amplitude level between a first level, a second level and a third level; the third level having an absolute value greater than the absolute value of the second level;
        wherein the gradient calculator is adapted to calculate a first gradient value of the response signal upon a change of amplitude of the drive signal from the first level to the third level; a second gradient value of the response signal when the amplitude of the drive signal is at the third level; and a final gradient value based on the first gradient value, wherein the controller is adapted to change the amplitude of the drive signal from the third level to the second level using the selector upon identifying that the second gradient value has reached the final gradient value.

15. The control system as claimed in claim 14, wherein the response signal evolves asymptotically towards a response level.

16. The control system as claimed in claim 14, wherein the device comprises a resonance frequency, the control system comprising a frequency controller adapted to adjust the drive signal to drive the device at the resonance frequency.

17. The control system as claimed in claim 14, wherein the driver is a current driver to provide a current signal, and wherein the sensor is a voltage sensor to sense a voltage across the oscillating device.

18. A system comprising
a device adapted to provide a response signal, and a control system, the control system comprising
a driver adapted to provide a drive signal to the device; wherein the drive signal comprises an amplitude;
a sensor adapted to sense an electrical parameter of the response signal; and
a controller coupled to the sensor and to the driver, the controller comprising
a gradient calculator; and
a selector coupled to the gradient calculator, for selecting an amplitude level of the drive signal; wherein the selector is adapted to select the amplitude level between a first level, a second level and a third level; the third level having an absolute value greater than the absolute value of the second level;

wherein the gradient calculator is adapted to calculate a first gradient value of the response signal upon a change of amplitude of the drive signal from the first level to the third level; a second gradient value of the response signal when the amplitude of the drive signal is at the third level; and a final gradient value based on the first gradient value, wherein the controller is adapted to change the amplitude of the drive signal from the third level to the second level using the selector upon identifying that the second gradient value has reached the final gradient value.

* * * * *